JOHN H. THOMAS.
Improvement in Seed-Drills.

No. 114,226. Patented April 25, 1871.

United States Patent Office.

JOHN H. THOMAS, OF SPRINGFIELD, OHIO.

Letters Patent No. 114,226, dated April 25, 1871.

IMPROVEMENT IN SEED-DRILLS.

The Schedule referred to in these Letters Patent and making part of the same.

*To all whom it may concern:*

Be it known that I, JOHN H. THOMAS, of Springfield, in the county of Clark and State of Ohio, have invented a certain Improvement in Grain-Drills; and I do hereby declare that the following is a full, clear, and exact description thereof, reference being had to the annexed drawing making part of this specification, in which—

The same letters of reference are employed in both figures in the designation of identical parts.

Figure 1:
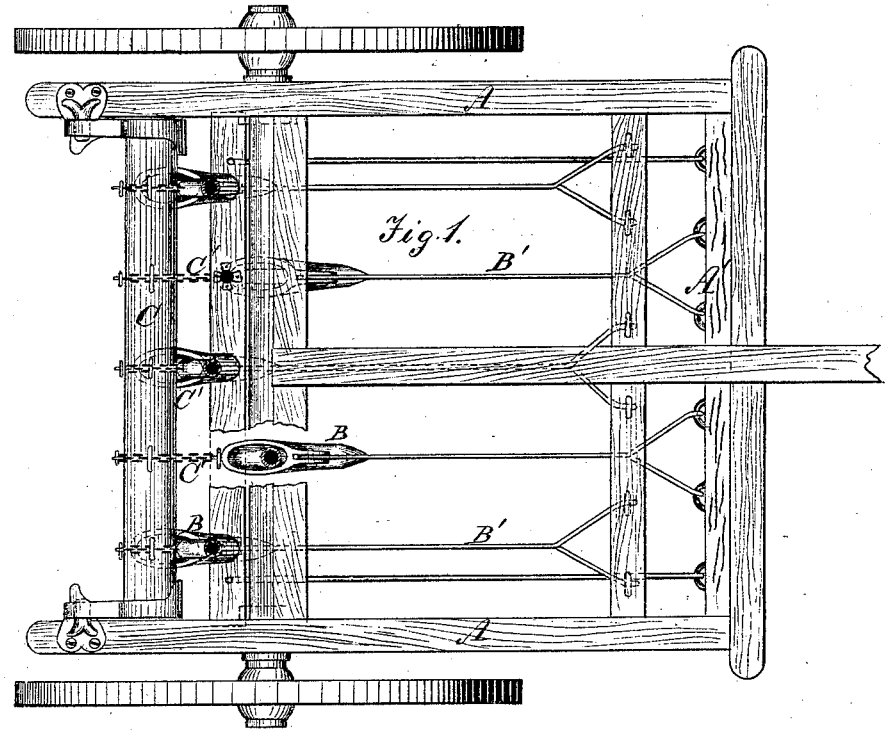
Figure 1 is a plan view of the grain-drill without the seed-box.
Figure 2:
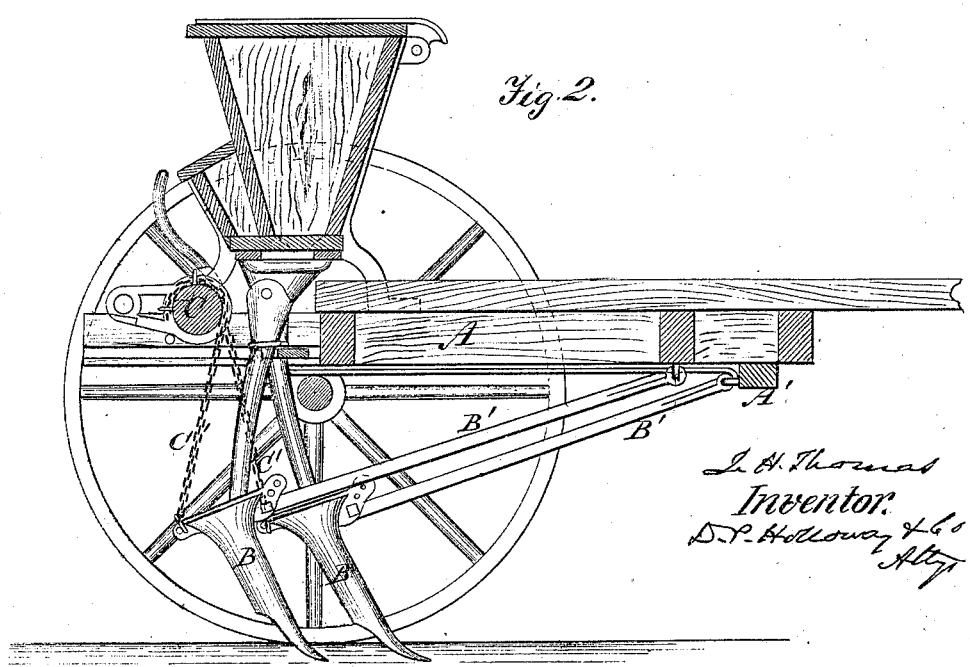
Figure 2 is a vertical longitudinal section.

This invention relates to grain-drills with hoes so arranged that they may be set in a row or in a zigzag line without detaching the drag-bars; and My improvement consists in such an arrangement of the "lift-bar" with reference to the hoes that the chains by which the latter are suspended from the former will hold all the hoes in the same horizontal plane with reference to one another, whether they are arranged in a row or in a zigzag line.

To enable those skilled in the art to make and use my invention, I will proceed to describe its construction and operation.

In the machine selected to illustrate my invention every alternate one of the hoes B is permanently attached by its drag-bar B' to the forward end of the frame A, while the others are similarly hinged to a cross-bar, A', which is so arranged that it may be slid in the direction of the length of the frame to set the hoes attached to it either in line with the permanent hoes or in advance of the latter.

All the hoes are suspended from a common lift-bar, C, by chains C'.

No special regard has been paid heretofore in drills of this class to the position of the lift-bar with reference to the hoes; and it became necessary, on changing the latter from single-file to a zigzag line or double-file, or *vice versa*, to alter the length of the chains by which the hoes thus shifted were suspended, in order that all the hoes might enter the soil to the same depth, and be elevated to the same height when lifted. As changes in the position of the hoes occur quite frequently in the field, this letting out and taking up of the chains consumes considerable time. This I obviate by arranging the lift-bar to occupy such a position when the hoes have been lowered that vertical lines drawn down that side of the lift-bar from which the chains depend shall lie in a plane transverse to the machine, midway between the points where the front and rear series of hoes are attached to the chains, when such hoes are arranged in a zigzag line, as shown in the drawing.

It is obvious that in shifting the front series of hoes so as to stand in line with the rear series their chains will diverge as much to the rear from this vertical line as they do diverge forward in the position shown, and therefore hold the hoes at the same height in either position.

This arrangement of the lift-bar holds good in machines where all the hoes are shifted in disposing them from a row to a zigzag line, or *vice versa*.

What I claim as my invention, and desire to secure by Letters Patent, is—

In a seed-drill, with hoes so arranged that they may be disposed either in a row or in a zigzag line, the arrangement of the lift-bar with reference to the hoes, substantially as set forth.

JOHN H. THOMAS.

Witnesses:
 H. S. SHOWERS,
 JNO. M. SPECK.